United States Patent
He et al.

(10) Patent No.: US 11,838,621 B2
(45) Date of Patent: Dec. 5, 2023

(54) COLLABORATIVE SHOOTING UTILIZING PREVIEW IMAGES AND MULTIPLE TERMINALS

(71) Applicant: Beijing Bytedance Network Technology Co., Ltd., Beijing (CN)

(72) Inventors: Panlong He, Beijing (CN); Lei Shi, Beijing (CN); Chenman Zhou, Beijing (CN); Fanhua Feng, Beijing (CN); Zhihao Zhang, Beijing (CN)

( * ) Notice: Subject to any disclaimer, the term of this patent is extended or adjusted under 35 U.S.C. 154(b) by 0 days.

(21) Appl. No.: 18/089,424

(22) Filed: Dec. 27, 2022

(65) Prior Publication Data
US 2023/0128746 A1   Apr. 27, 2023

Related U.S. Application Data

(63) Continuation of application No. PCT/CN2021/114912, filed on Aug. 27, 2021.

(30) Foreign Application Priority Data

Aug. 31, 2020 (CN) .......................... 202010901602.X

(51) Int. Cl.
*H04N 23/60* (2023.01)
*G06F 3/16* (2006.01)
*H04N 23/63* (2023.01)

(52) U.S. Cl.
CPC ............. *H04N 23/64* (2023.01); *G06F 3/167* (2013.01); *H04N 23/632* (2023.01)

(58) Field of Classification Search
CPC ....... H04N 23/64; H04N 23/632; G06F 3/167
See application file for complete search history.

(56) References Cited

U.S. PATENT DOCUMENTS

| | | | |
|---|---|---|---|
| 8,693,807 B1* | 4/2014 | Gossweiler, III | H04N 1/00347 382/296 |
| 2015/0269148 A1 | 9/2015 | Cudak et al. | |

(Continued)

FOREIGN PATENT DOCUMENTS

| CN | 103051840 A | 4/2013 |
|---|---|---|
| CN | 105450848 A | 3/2016 |

(Continued)

OTHER PUBLICATIONS

China National Intellectual Property Administration, Notification to Grant Patent Right for Invention issued in Chinese Application No. 202010901602.x, dated May 11, 2022, 4 pages.

(Continued)

*Primary Examiner* — Ahmed A Berhan
(74) *Attorney, Agent, or Firm* — Alleman Hall Creasman & Tuttle LLP

(57) ABSTRACT

The present disclosure provides a photographing method and apparatus, an electronic device, and a computer readable storage medium, relating to the technical field of image processing. Said method is applied to a first terminal. Said method comprises: in a cooperative photographing process, transmitting, to a second terminal, a preview image acquired by the first terminal; receiving cooperative photographing information inputted by the second terminal on the basis of the preview image, the cooperative photographing information being used for performing photographing control on the first terminal; executing a cooperative photographing operation corresponding to the cooperative photographing information; and outputting a target image obtained by the first terminal after executing the cooperative photographing operation. The implementation of the present disclosure is beneficial for improving the image photographing quality, (Continued)

and reducing operation cost when a user performs photographing by himself/herself.

13 Claims, 5 Drawing Sheets

(56) References Cited

U.S. PATENT DOCUMENTS

| | | | |
|---|---|---|---|
| 2018/0160026 A1 | 6/2018 | Kwon et al. | |
| 2020/0059605 A1* | 2/2020 | Liu | H04N 23/667 |
| 2020/0099838 A1 | 3/2020 | Song et al. | |

FOREIGN PATENT DOCUMENTS

| | | |
|---|---|---|
| CN | 106713732 A | 5/2017 |
| CN | 108718383 A | 10/2018 |
| CN | 109361869 A | 2/2019 |
| CN | 110971823 A | 4/2020 |
| CN | 111050072 A | 4/2020 |
| CN | 111988528 A | 11/2020 |

OTHER PUBLICATIONS

China National Intellectual Property Administration, the First Office action issued in Chinese Application No. 202010901602.x, dated Jun. 10, 2021, 7pages.

ISA China National Intellectual Property Administration, International Search Report and Written Opinion issued in Application No. PCT/CN2021/114912, dated Nov. 30, 2021, WIPO, 4 pages.

Zhang J. et al., "Smartphone camera system based on Bluetooth technology and face recognition technology" Science & Technology Information, No. 22, 2018, 5 pages.

* cited by examiner

COLLABORATIVE SHOOTING UTILIZING PREVIEW IMAGES AND MULTIPLE TERMINALS

CROSS-REFERENCE TO RELATED APPLICATIONS

The present application is a continuation application of International Application No. PCT/CN2021/114912, titled "PHOTOGRAPHING METHOD AND APPARATUS, ELECTRONIC DEVICE, AND COMPUTER READABLE STORAGE MEDIUM", filed on Aug. 27, 2021, which claims priority to Chinese Patent Application No. 202010901602.X, titled "PHOTOGRAPHING METHOD AND APPARATUS, ELECTRONIC DEVICE, AND COMPUTER READABLE STORAGE MEDIUM", filed on Aug. 31, 2020, both of which are incorporated herein by reference in their entireties.

FIELD

The present disclosure relates to the technical field of image processing, and in particular, to a photographing method, a photographing apparatus, an electronic device, and a computer readable storage medium.

BACKGROUND

With the development of the mobile internet and the popularization of mobile terminals, more and more users begin to produce user-generated content and upload it to social platforms to share with others. Usually, content producers use the shooting device on the mobile terminal to shoot their favorite images and videos, and upload the images and videos to social platforms to share with other users.

Currently, most users often work alone during content production, and when shooting is performed alone, it may be difficult to obtain an optimal image through a single shot, and multiple shots are generally necessary, which is inefficient while the shooting quality cannot be guaranteed.

SUMMARY

This summary section is provided to introduce concepts in a simplified form that are described in detail in the embodiment section that follows. This summary section is not intended to identify key features or essential features of the claimed technical solution, nor is it intended to be used to limit the scope of the claimed technical solution.

In a first aspect, a shooting method is provided according to an embodiment of the present disclosure. The shooting method is applied to a first terminal and includes: sending a preview image obtained by the first terminal to a second terminal during a collaborative shooting process; receiving collaborative shooting information inputted by the second terminal based on the preview image, the collaborative shooting information being used to instruct a shooting process of the first terminal; performing a collaborative shooting operation corresponding to the collaborative shooting information; and outputting a target image obtained by the first terminal performing the collaborative shooting operation.

In a second aspect, a shooting apparatus is provided according to an embodiment of the present disclosure. The shooting apparatus is applied to a first terminal and includes: an information sending module, configured to send a preview image obtained by the first terminal to a second terminal during a collaborative shooting process; an information receiving module, configured to receive collaborative shooting information inputted by the second terminal based on the preview image, the collaborative shooting information being used to instruct a shooting process of the first terminal; a shooting control module, configured to perform a collaborative shooting operation corresponding to the collaborative shooting information; and an image output module, configured to output a target image obtained by the first terminal performing the collaborative shooting operation.

In a third aspect, an electronic device is provided according to an embodiment of the present disclosure. The electronic device includes one or more computer programs, where the one or more computer programs are stored in a memory and configured to be executed by one or more processors, the one or more computer programs are configured to execute the method described in the first aspect.

In a fourth aspect, a computer-readable storage medium is provided according to an embodiment of the present disclosure. The computer-readable storage medium stores a computer program, the computer program being invoked by a processor to execute the method described in the first aspect.

A shooting method, a shooting apparatus, an electronic device, and computer-readable storage medium, that are applied to a first terminal, are provided according to the embodiments of the present disclosure. The first terminal sends the preview image obtained by the first terminal to the second terminal during the collaborative shooting process, receives the collaborative shooting information that is inputted by the second terminal based on the preview image and that is used to instruct the shooting process of the first terminal, performs the collaborative shooting operation corresponding to the collaborative shooting information, and outputs the target image obtained after performing the collaborative shooting operation. In this way, in the embodiments of the present disclosure, the first terminal may send the preview image obtained by itself to the second terminal, so that the second user may view the preview image obtained by the first terminal in real time by using the second terminal, and input the collaborative shooting information through the second terminal, where the collaborative shooting information is sent to the first terminal to remotely control the first terminal, so as to control the shooting of the first terminal, so that the user may invite others to assist the user in shooting, reducing the operating cost when the user shoots alone, and improving the shooting quality.

BRIEF DESCRIPTION OF THE DRAWINGS

The above and other features, advantages and aspects of various embodiments of the present disclosure will become more apparent when taken in conjunction with the accompanying drawings and with reference to the following detailed description. Throughout the drawings, the same or similar reference numbers refer to the same or similar elements. It should be understood that the drawings are schematic and that the components and elements are not necessarily drawn to scale.

DESCRIPTION OF EMBODIMENTS

Figure 1:
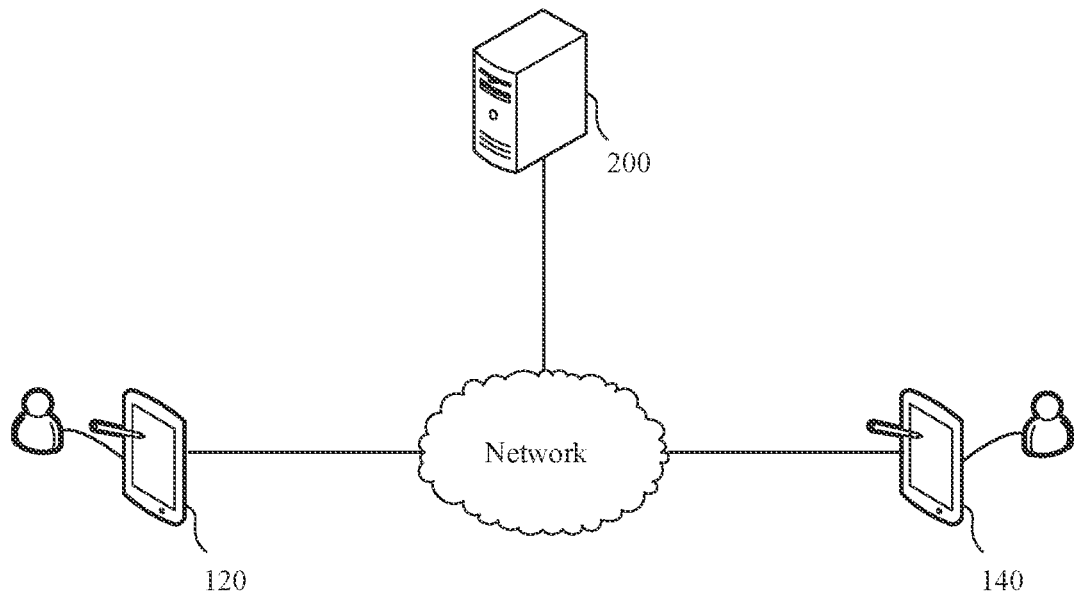
FIG. 1 shows a schematic diagram of an implementation environment applicable to an embodiment of the present disclosure.

Embodiments of the present disclosure will be described in more detail below with reference to the accompanying drawings. While certain embodiments of the present disclosure are shown in the drawings, it should be understood that the present disclosure may be embodied in various forms and should not be construed as limited to the embodiments set forth herein. Instead, the embodiments are provided for the purpose of a more thorough and complete understanding of the present disclosure. It should be understood that the drawings and embodiments of the present disclosure are only for exemplary purposes, and are not intended to limit the scope of the present disclosure.

It should be understood that the various steps described in the method embodiments of the present disclosure may be performed in different orders, and/or performed in parallel. Furthermore, method embodiments may include additional steps and/or omit performing the illustrated steps. The scope of the present disclosure is not limited in this regard.

As used herein, the term "including" and variations thereof are open-ended inclusions, i.e., "including but not limited to". The term "based on" is "based at least in part on." The term "one embodiment" means "at least one embodiment"; the term "another embodiment" means "at least one additional embodiment"; the term "some embodiments" means "at least some embodiments". Relevant definitions of other terms will be given in the description below.

It should be noted that concepts such as "first" and "second" mentioned in the present disclosure are only used to distinguish between different devices, modules or units, and are not used to limit these devices, modules or units to be different devices, modules or units, or limit the order of functions performed by these devices, modules or units or interdependence between these devices, modules or units.

It should be noted that the modifications of "a" and "a plurality" mentioned in the present disclosure are illustrative rather than restrictive, and those skilled in the art should understand that unless the context clearly indicates otherwise, they should be understood as "one or a plurality of".

The names of messages or information exchanged between multiple devices in the embodiments of the present disclosure are for only illustrative purposes, and are not intended to limit the scope of these messages or information.

The technical solutions of the present disclosure and how the technical solutions of the present disclosure solve the above-mentioned technical problems will be described in detail below with specific embodiments. The following specific embodiments may be combined with each other, and the same or similar concepts or processes may not be repeated in some embodiments. The embodiments of the present disclosure will be described below with reference to the accompanying drawings.

FIG. 1 shows a schematic diagram of an implementation environment applicable to an embodiment of the present disclosure. The implementation environment includes a first terminal 120 and a second terminal 140.

The first terminal 120 and the second terminal 140 may be mobile phones, tablet computers, MP3 (Moving Picture Experts Group Audio Layer III) players, MP4 (Moving Picture Experts Group Audio Layer IV) players, wearable devices, in-vehicle devices, Augmented Reality (AR)/Virtual Reality (VR) devices, laptops, Ultra-Mobile Personal Computers (UMPC), netbooks, personal digital assistants (PDA) or specialized cameras (such as single-lens reflex cameras, card cameras), and the like. The type of the terminal is not limited in the embodiments of the present disclosure.

In addition, the first terminal 120 and the second terminal 140 may be of the same type, or may be of different types, which is not limited in the embodiments of the present disclosure.

A first client and a second client respectively run in the first terminal 120 and the second terminal 140. The first client and the second client may be client applications corresponding to a collaborative shooting platform, other client applications with collaborative shooting functions, or applications corresponding to short video platforms, social platforms, and the like, that support image and video sharing, which is not limited in the embodiments of the present disclosure.

The first terminal 120 and the second terminal 140 may be directly connected through a wired network or a wireless network with each other. Alternatively, the implementation environment may further include a server 200, and the first terminal 120 may be connected to the second terminal 140 through the server 200, and the server 200 may be connected to the first terminal 120 and the second terminal 140 respectively through a wired network or a wireless network.

The server 200 may be a traditional server, a cloud server, a single server, a server cluster composed of several servers, or a cloud computing service center.

A shooting method, a shooting apparatus, an electronic device, and a computer-readable storage medium according to the embodiments of the present disclosure will be described in detail below through specific embodiments.

Figure 2:
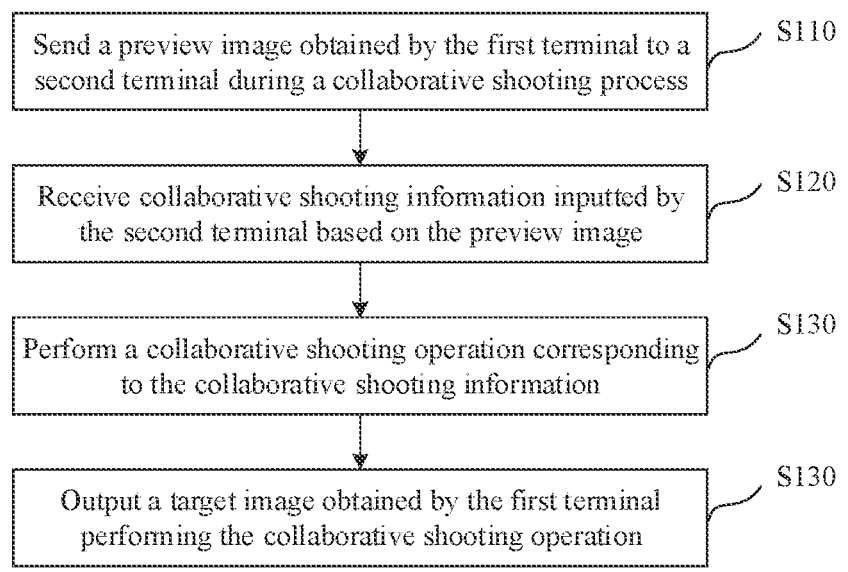
FIG. 2 shows a flowchart of a shooting method according to an embodiment of the present disclosure.

Reference is made to FIG. 2, which shows a flowchart of a shooting method according to an embodiment of the present disclosure. The method may be applied to the above terminal or server. In the following, a case where the method is applied to a first terminal is taken as an example, to describe the process shown in FIG. 2 in detail. The shooting method may include the following steps S110 to S140.

In step S110, a preview image obtained by the first terminal is sent to a second terminal during a collaborative shooting process.

In some implementations, the first terminal may start collaborative shooting in response to confirmation information returned from the second terminal after confirming a collaborative shooting request, and send the preview image obtained by the first terminal to the second terminal during the collaborative shooting process.

The collaborative shooting request is used to initiate a collaborative shooting invitation, to request another user to assist or help the user of the first terminal to perform shooting. If the other user agrees to the collaborative shooting invitation, the other user may confirm the collaborative shooting request through his or her terminal, so as to generate corresponding confirmation information, which is returned to the first terminal.

For ease of understanding, in the description of the present disclosure, the mentioned first terminal refers to the initiator of the collaborative shooting request, the mentioned second terminal mentioned refers to the recipient of the collaborative shooting request, the user of the first terminal is referred to as the first user, the user of the second terminal is referred to as the second user.

It should be noted that, in the embodiments of the present disclosure, data may be directly transmitted or may be transmitted through a server between the first terminal and the second terminal. For example, the first terminal may send the collaborative shooting request to the second terminal through the server, and the confirmation information generated by the second terminal after confirming the collaborative shooting request may be sent to the first terminal through the server. In some implementations, the confirmation information may not be sent to the first terminal, and after the server receives the confirmation information, the server directly establishes a connection between the second terminal and the first terminal, by establishing a channel through which the first terminal directly interacts with the second terminal, or by establishing a channel through which the first terminal interacts with the second terminal through the server, so that the first terminal may interact with the second terminal through the established channel.

In some implementations, the first user may generate the collaborative shooting request on a collaborative shooting platform through the first terminal, and the first terminal may send the collaborative shooting request to the second terminal through the collaborative shooting platform or through another platform capable of responding to the collaborative shooting request. Alternatively, the collaborative shooting request may not be sent to a determined terminal, but collaborative shooting invitation information is published, and confirmation for the collaborative shooting invitation information from another terminal is expected, which is not limited in the embodiments of the present disclosure. Some specific implementation manners may be seen in the following embodiments, which are not described in detail here.

In an example, if the first user is to perform collaborative shooting with the second user, the first user may select the second user in a social application (an application corresponding to a social platform), such as instant messaging application installed on the terminal, and clicks on a control corresponding to collaborative shooting in a function menu to trigger a control instruction for collaborative shooting. The first terminal sends the collaborative shooting request to the second terminal of the second user in response to the control instruction. On reception of the collaborative shooting request, the second terminal may pop up a corresponding prompt message, such as "The first user requests to perform collaborative shooting with you, please select "Reject" or "Agree"" in its display interface, the second user may click on the button indicating "Agree" to confirm the collaborative shooting request, and a responsive confirmation message is generated and sent to the first terminal. On reception of the confirmation message, the first terminal may start collaborative shooting with the second terminal.

In another example, the first terminal may be pre-installed with an application corresponding to a collaborative shooting platform, which is referred to as a collaborative shooting application, and the first user may open the collaborative shooting application to initiate the collaborative shooting function. Next, in one manner, the first user may select the second user in the collaborative shooting application, so as to send the collaborative shooting request to the second terminal used by the second user; in another manner, the first user may click on a control for collaborative shooting in the collaborative shooting application, and the collaborative shooting request is generated and forwarded to another application by jumping to the other application, to invite a user of the other application to perform collaborative shooting. The confirmation manner is similar to that described above, and is not described in detail here.

It can be understood that the above are only two exemplary manners for performing collaborative shooting among multiple terminals, and the present disclosure is not limited to the above examples.

There may be one or multiple second terminals, that is, the first terminal may send the collaborative shooting request to one or more second terminals, and may establish connections with one or more second terminals to perform collaborative shooting at the same time. In addition, the second user may or may not be a contact of the first user, may be on the same application or platform as the first user and have a friend relationship with the first user, may only unilaterally follow the first user or may be unilaterally followed by the first user, or may not have a following relationship with the first user, which is not limited in the embodiments of the present disclosure.

In some embodiments, during the collaborative shooting process, the first terminal may send a shooting interface of the first terminal to the second terminal, where the shooting interface includes at least one function control and the preview image obtained by the first terminal.

In some embodiments, when the first terminal sends the preview image to the second terminal during the collaborative shooting process, the first terminal may send only the preview image instead of the shooting interface including both at least one function control and the preview image.

The shooting interface may be a shooting interface of a shooting application installed on the first terminal, and the shooting interface may display at least one function control and the preview image obtained by the first terminal. Each function control may correspond to at least one function. For example, the shooting interface may display at least one of a shooting control for triggering a shooting instruction and other functional controls for adjusting an image display effect, which is not limited herein.

In an example, in a photographing mode, the preview image currently obtained by the first terminal may be displayed in a screen display area in the shooting interface before the user clicks on the shooting control. When the user clicks on the shooting control, the first terminal may detect an operation performed on the shooting control and performs an operation corresponding to the shooting control, that is, capturing the preview image obtained by the first terminal to obtain the captured image, to implement the photographing function.

The preview image may be an original image obtained by the first terminal through an image acquisition device, or may be an image obtained by adjusting the original image. The image acquisition device may be a camera integrated in the first terminal, which may be a front camera or a rear camera, or may be an external device connected to the first terminal in a wireless or wired manner, such as an external camera, which is not limited here.

In some implementations, the preview image obtained by the first terminal may be displayed in a screen display area of the shooting interface, so that the user may preview the image obtained by the image acquisition device in real time through the first terminal.

During the collaborative shooting process, the first terminal may send the preview image obtained by the first terminal to the second terminal, so that after confirming the collaborative shooting request sent by the first terminal, the second user may receive and view the preview image obtained by the first terminal in real time.

In some embodiments, in order to reduce the transmitted data amount and improve the transmission efficiency, the first terminal may send only the preview image to the second terminal, rather than a complete shooting interface combining the preview image and other display content of the shooting interface.

In step S120, collaborative shooting information inputted by the second terminal based on the preview image is received.

In step S130, a collaborative shooting operation corresponding to the collaborative shooting information is performed.

The collaborative shooting information is used to instruct a shooting process of the first terminal. For example, the collaborative shooting information may be used to adjust shooting parameters of the first terminal during the shooting process, to communicate with the first user during the shooting process, or to control the shooting process of the first terminal. For the specific implementation thereof, reference can be made to following description in corresponding parts. In this way, the collaborative shooting information may be used to control the first terminal to perform shooting. The first terminal is controlled to perform a corresponding collaborative shooting operation on reception of the collaborative shooting information inputted by the second terminal based on the preview image.

On reception of the collaborative shooting information sent by the second terminal, the first terminal may perform a collaborative shooting operation corresponding to the collaborative shooting information.

In some implementations, when the second terminal receives the preview image sent from the first terminal, the second user may view the preview image obtained by the first terminal by using the second terminal, and the second user may input the collaborative shooting information through the second terminal based on the preview image obtained by the first terminal. The second terminal sends the collaborative shooting information to the first terminal, and the first terminal may perform the collaborative shooting operation corresponding to the collaborative shooting information on reception of the collaborative shooting information. In this way, the first user may send the preview image obtained by the first terminal to the second terminal when needing someone to assist in shooting, so that the second user may view the preview image of the first terminal in real time through the second terminal and remotely control the first terminal, to assist the first user in shooting, thereby reducing the operating cost of the first user when shooting alone, and improving the shooting quality.

In some embodiments, the collaborative shooting information may include a shooting adjustment instruction for adjusting a shooting parameter of the first terminal during the shooting process. The shooting parameter is used to control the image shooting operation of the first terminal to obtain the target image, and the shooting parameter may include at least one of various parameters including image brightness, contrast, saturation, sharpness, shutter speed, sensitivity, focus position, and other parameters that affect the image display effect. In some implementations, the shooting adjustment instruction may be inputted by the second user by using the second terminal and used to control the first terminal to adjust the preview image currently obtained by the first terminal. In an implementation, the second terminal may obtain a corresponding shooting adjustment instruction by detecting a trigger operation acting on display information of the first terminal, and send the shooting adjustment instruction to the first terminal, and the first terminal receives the shooting adjustment instruction and performs the collaborative shooting operation corresponding to the shooting adjustment instruction, to adjust the preview image currently obtained by the first terminal. For the specific implementation, reference can be made to the following embodiments, which will not be repeated here.

In other embodiments, the collaborative shooting information may be used to communicate with the first user during the shooting process, that is, the collaborative shooting information may include adjustment prompt information for prompting the first user and/or the first terminal to make adjustments, and the second user may communicate with the first user through the collaborative shooting information. The adjustment prompt information may be voice, text or information in other forms that is inputted by the second user. In some implementations, the adjustment prompt information may be used to prompt the first user to adjust at least one of a posture of the first user, a position of the first user, a posture of the first terminal, and a position of the first terminal. In addition, in some implementations, the adjustment prompt information may be used to prompt the first user to manually manipulate the preview image of the first terminal, and the second user may input adjustment prompt information based on the preview image of the first terminal displayed on the second terminal. The second terminal obtains the adjustment prompt information and sends the adjustment prompt information to the first terminal. The first terminal receives the adjustment prompt information, and outputs the adjustment prompt information, to prompt the first user to perform the collaborative shooting operation corresponding to the adjustment prompt information. In this way, even if the terminal hardware or the network environment does not support remote control, the first user may be assisted through the adjustment prompt information in shooting. For the specific implementation, reference can be made to the following embodiments, which will not be repeated here.

In other embodiments, the collaborative shooting information may be used to control the shooting process of the first terminal. For example, the collaborative shooting information may include a shooting instruction for to controlling the first terminal to capture the currently obtained preview image. On reception of the shooting instruction, the first terminal may respond to the shooting instruction to capture the preview image currently obtained by the first terminal, to obtain the captured image. In addition, if the first user needs to shoot a video, the collaborative shooting information may further be used to control the first terminal to start recording, end recording, and the like, that is, the second user may assist the first user in only triggering an instruction to control the shooting process, such as clicking on a shooting control, a voice input shooting instruction, a gesture input shooting instruction, and the like. For the specific implementation, reference can be made to the following embodiments, which will not be repeated here.

In some embodiments, the collaborative shooting information may include two or more of the shooting adjustment instruction, the adjustment prompt information, and the shooting instruction, so that the second user may not only directly control the first terminal remotely, but also instruct the second user to perform adjustment by using the adjustment prompt information, so as to adjust the framing, composition, character posture, and the like of the preview image, and may further control the shooting process of the first terminal by using the shooting instruction.

In step S140, a target image obtained by the first terminal performing the collaborative shooting operation is outputted.

After the first terminal performs the collaborative shooting operation corresponding to the collaborative shooting information, the first terminal may output the target image obtained by the first terminal performing the collaborative shooting operation. In some implementations, the output manner may include, but is not limited to, storing the target image, uploading the target image to a server, or prompting the user whether to share the target image, and the like, which is not limited here.

In some embodiments, the collaborative shooting information may include a shooting instruction, and the first terminal may, on reception of the shooting instruction sent by the second terminal, capture the preview image currently obtained by the first terminal, obtain the captured image as a target image, and output the target image. The output manner may include, but is not limited to, storing the captured target image, uploading the captured target image to the server, or further prompting the user whether to share the target image, and the like, which is not limited here.

In other embodiments, the shooting instruction may alternatively be triggered locally by the first terminal, that is, the first terminal may obtain the shooting instruction, capture the preview image currently obtained by the first terminal in response to the shooting instruction, and obtain the captured target image. The first terminal may obtain the shooting instruction inputted in any manner, such as voice input, gesture input, earphone key input, and clicking on a shooting control. The triggering method of the shooting instruction is not limited in the embodiments.

In the shooting method according to this embodiment, the first terminal sends the preview image obtained by the first terminal to the second terminal during the collaborative shooting process, receives the collaborative shooting information that is inputted by the second terminal based on the preview image and that is used to instruct the shooting process of the first terminal, performs the collaborative shooting operation corresponding to the collaborative shooting information, and outputs the target image obtained after performing the collaborative shooting operation. In this way, in the embodiment of the present disclosure, the first terminal may send the preview image obtained by itself to the second terminal, so that the second user may view the preview image obtained by the first terminal in real time by using the second terminal, and input the collaborative shooting information through the second terminal, where the collaborative shooting information is sent to the first terminal to remotely control the first terminal, so as to control the shooting of the first terminal, so that the user may invite others to assist the user in shooting, reducing the operating cost when the user shoots alone, and improving the shooting quality. Further, content creators can improve their own creation efficiency and creation quality, and further, the photographer who assists the shooting, that is, the second user, can also obtain the happiness of helping others such as friends, relatives or strangers. In addition, this embodiment as a whole also enriches the social interaction gameplay of shooting.

Figure 3:
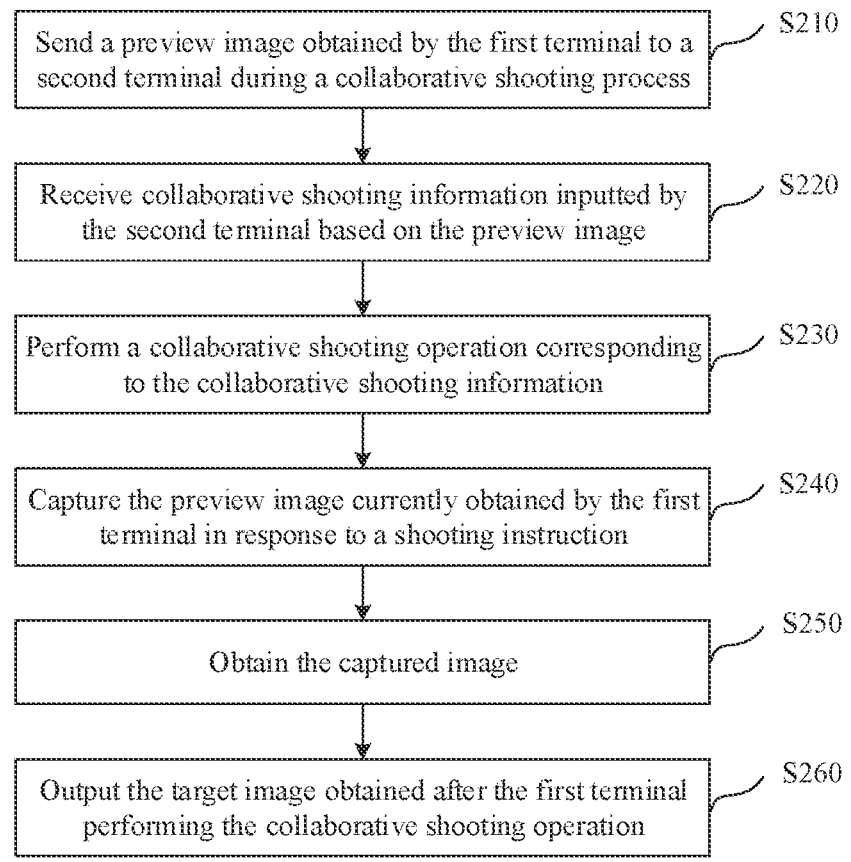
FIG. 3 shows a flowchart of a shooting method according to another embodiment of the present disclosure.

Reference is made to FIG. 3, which shows a flowchart of a shooting method according to another embodiment of the present disclosure. The shooting method may be applied to the above-mentioned terminal or server and may include the following steps S210 to S260.

In step S210, a preview image obtained by the first terminal is sent to a second terminal during a collaborative shooting process.

In some implementations, step S210 may be implemented by: sending a shooting interface of the first terminal to the second terminal during the collaborative shooting process, where the shooting interface includes at least one function control and the preview image obtained by the first terminal.

In step S220, collaborative shooting information inputted by the second terminal based on the preview image is received.

In step S230, a collaborative shooting operation corresponding to the collaborative shooting information is performed.

In some embodiments, the collaborative shooting information may include a shooting adjustment instruction inputted by a second user corresponding to the second terminal based on display information of the first terminal, and the first terminal may obtain the shooting adjustment instruction inputted by the second terminal based on the display information, and adjust a shooting parameter of the first terminal according to the shooting adjustment instruction, so as to adjust the preview image currently obtained by the first terminal.

The shooting adjustment instruction may be generated in response to a trigger operation acting on the shooting interface or the preview image, which is not limited in this embodiment.

In some implementations, if the second terminal detects an operation acting on the preview image, the second terminal may obtain a corresponding shooting adjustment instruction. For example, the shooting adjustment instruction may be used to adjust at least one of focus and local image parameters including local brightness, contrast, saturation, and the like. The shooting adjustment instruction is sent to the first terminal to control the first terminal to perform the collaborative shooting operation corresponding to the shooting adjustment instruction.

In an example, if the second user clicks on a position S on the preview image on the second terminal, the second terminal may detect the click operation acting on the position S on the preview image, and obtain an interface reference instruction corresponding a focus function, which is referred to as a focus instruction. The focus instruction is sent to the first terminal. The first terminal obtains the focus instruction, and may focus the camera of the first terminal on the position S on the preview image to adjust the focus, such that the focus of the preview image is located at the position S.

In some implementations, if the second terminal detects an operation acting on a control displayed on the shooting interface, the second terminal may obtain the shooting adjustment instruction corresponding to the control and send the shooting adjustment instruction to the first terminal. The first terminal obtains the shooting adjustment instruction, and performs the collaborative shooting operation corresponding to the shooting adjustment instruction. In this way, for the preview image currently obtained by the first terminal, the second user may input the shooting adjustment instruction based on the function control on the shooting interface of the first terminal displayed on the second terminal. The shooting adjustment instruction is sent by the second terminal to the first terminal, so as to operate the function control on the shooting interface of the first terminal, to adjust the shooting parameter corresponding to the function control, thereby performing the corresponding function. For example, according to the function control on which the operation acts, brightness, contrast, saturation, sharpness, shutter speed, sensitivity, and the like of the image may be adjusted, beautification effects such as beautifying, smoothing, and the like may be applied to the image, the camera may be flipped, filters may be applied, and the like.

It can be understood that a variety of functional controls may be displayed on the shooting interface, and different controls may correspond to different collaborative shooting operations and realize different functions. The foregoing is only an example, and is not exhaustive for brevity. The type and the function of the control on the shooting interface are not limited in these embodiments. In addition, in some embodiments, when the display information of the first terminal is displayed on the second terminal, the second terminal may detect a trigger operation acting on the display information, and obtain a corresponding shooting adjustment instruction, where according to different triggering operations, manipulation information carried by the shooting adjustment instruction may be different. The trigger operation may be a touch operation, an air gesture, and the like, which is not limited herein.

In some examples, if the trigger operation is a touch operation, the trigger information may include a trigger position corresponding to the touch operation, and the second terminal may send the trigger position to the first terminal, so that the first terminal may determine, based on the trigger position determined by the second user, a trigger position on the display information on the first terminal, so as to determine the shooting adjustment instruction corresponding to the trigger position. If the trigger position corresponds to a control on the shooting interface, the shooting adjustment instruction corresponding to the control may be obtained, so as to perform the collaborative shooting operation corresponding to the shooting adjustment instruction. If the trigger position corresponds to the preview image, the shooting adjustment instruction for focusing at the trigger position may be obtained, so as to adjust the first terminal to focus on the trigger position.

In some embodiments, the collaborative shooting information may include adjustment prompt information, and when obtaining the adjustment prompt information inputted by the second terminal based on the display information, the first terminal may output the adjustment prompt information to prompt the first user of the first terminal to adjust a position and/or a posture of a target object, where the target object includes the first terminal and/or the first user. The adjustment prompt information may be inputted by the second user corresponding to the second terminal based on the currently obtained preview image. Of course, the first terminal may also obtain information inputted by the first user and send the information to the second terminal for output, such that the first user communicates with the second user during the assisted shooting process.

Figure 4:
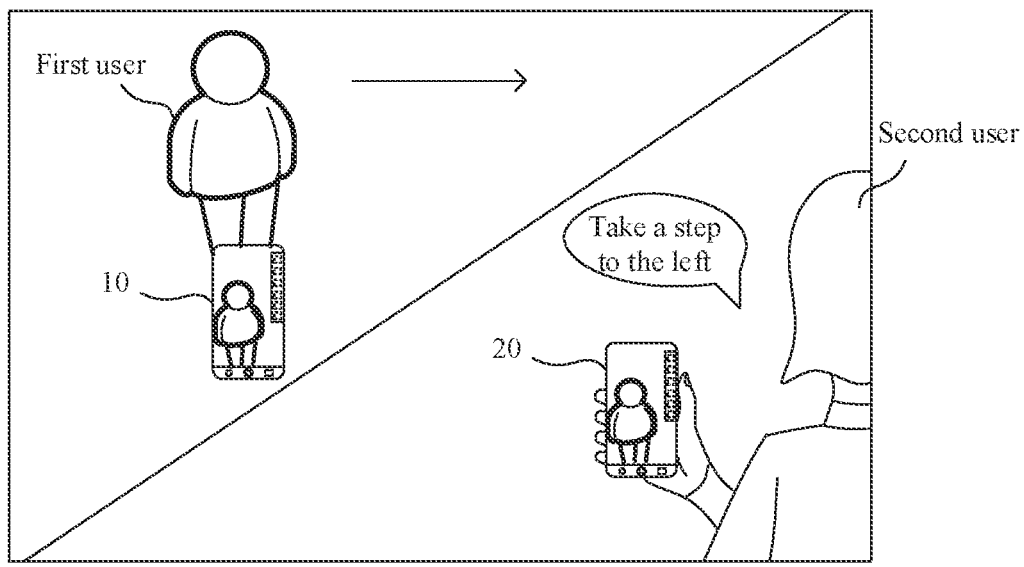
FIG. 4 shows a schematic diagram of a shooting scenario according to an exemplary embodiment of the present disclosure.

In an example, referring to FIG. 4, which shows a schematic diagram of a shooting scenario according to an exemplary embodiment of the present disclosure, the first user arranges the first terminal 10 at a certain position, the second terminal 20 confirms the collaborative shooting request sent by the first terminal 10, establishes a connection with the first terminal 10, receives the display information sent by the first terminal 10 and displays the display information. The second user may view the shooting interface of the first terminal 10 and the preview image obtained in real time through the second terminal 20, and the second user may input the collaborative shooting information through the second terminal 20 based on the preview image currently obtained by the first terminal 10, where the collaborative shooting information is sent to the first terminal 10, to cause the first terminal 10 to perform the collaborative shooting operation corresponding to the collaborative shooting information.

In some exemplary implementations, the second terminal 20 may detect a trigger operation acting on the display information sent by the first terminal 10 to obtain a corresponding shooting adjustment instruction.

Figure 5:
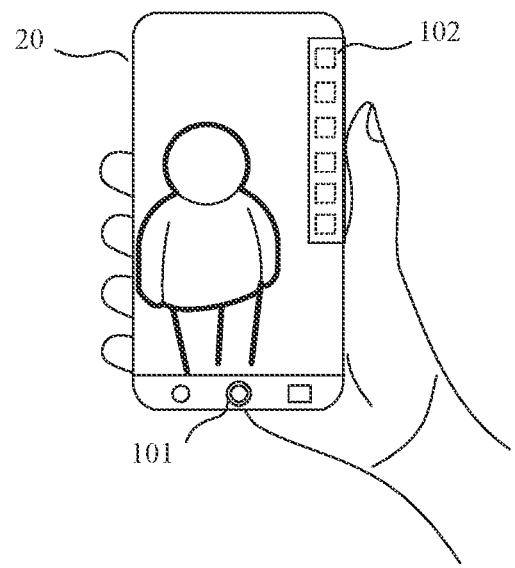
FIG. 5 shows a schematic diagram of an operation of a second terminal 20 according to an exemplary embodiment of the present disclosure.

In an implementation, the second terminal 20 may detect a trigger operation acting on the shooting interface, and obtain a corresponding shooting adjustment instruction. The shooting interface may display at least one control. Reference is made to FIG. 5, which shows a schematic diagram of an operation of the second terminal 20 according to an exemplary embodiment of the present disclosure. As shown in FIG. 5, the shooting interface may display a shooting control 101, and a function control 102 corresponding to another function. The second terminal 20 obtains, based on detection of a triggered control, the instruction corresponding to the control. For example, if the second terminal 20 detects a trigger operation acting on the function control 102, the second terminal obtains the corresponding shooting adjustment instruction and sends the shooting adjustment instruction to the first terminal 10. The first terminal 10 adjusts a corresponding shooting parameter according to the shooting adjustment instruction, so that the second user assists the first user in adjusting the shooting parameter of the first terminal 10.

In an example, if the function corresponding to the triggered function control 102 is to apply a filter, when the second user clicks on the function control 102, a filter applying page is displayed on the shooting interface of the first terminal 10. The filter applying page may display one or more filters. The first terminal 10 sends the current shooting interface and the preview image to the second terminal 20 for display, and the second user may select a filter based on the filter applying page on the shooting interface. It should be noted that, as the first terminal 10 sends the display information to the second terminal 20 in real time, the second user may view, through the second terminal 20, display information that is updated by the first terminal 10 in real time in response to the collaborative shooting information inputted by the second terminal 20 acting on the display information, thereby controlling shooting of the first terminal 10 in real time.

Figure 6:
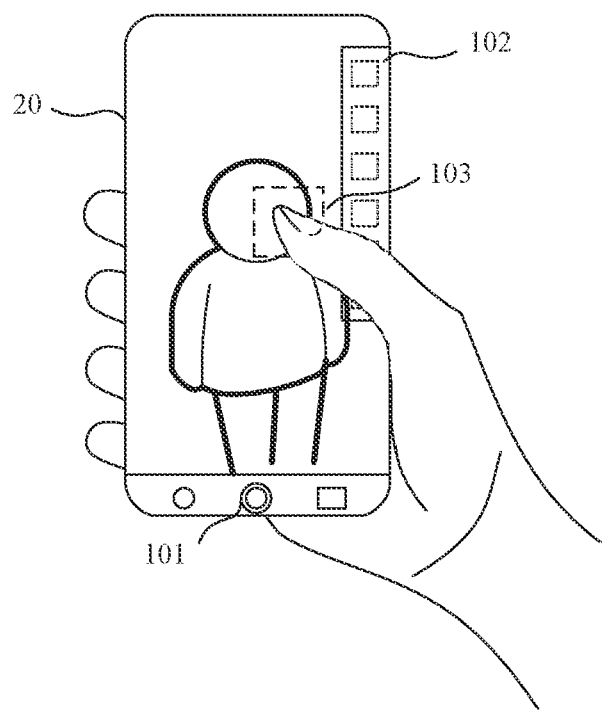
FIG. 6 shows a schematic diagram of an operation of a second terminal 20 according to another exemplary embodiment of the present disclosure.

In an implementation, the second terminal 20 may detect a trigger operation acting on the preview image, and obtain the corresponding shooting adjustment instruction, that is, the second user may input the shooting adjustment instruction based on the preview image obtained by the first terminal. Referring to FIG. 6, which shows a schematic diagram of an operation of the second terminal 20 according to an exemplary embodiment of the present disclosure, the second terminal 20 displays the shooting interface of the first terminal 10 and the preview image obtained in real time. If the face of the first user in the preview image is blurred and the second user wants to adjust the focus to make the face of the first user clearer, the second user may click on the area where the face of the first user is located, to trigger the second terminal 20 to obtain the instruction corresponding to the click operation and send the instruction to the first terminal 10. The first terminal 10 displays a focus frame 103 in an area corresponding to the click operation according to the instruction, and sends the updated display information to the second terminal 20, so that the display information after the first terminal 10 adjusts the focus is displayed on the second terminal 20, as shown in FIG. 6.

In some exemplary implementations, the second user may communicate with the first user through the second terminal 20, to instruct the first user to adjust the position and/or posture of at least one of the first user and the first terminal 10 to achieve better shooting effect, such as a better composition, a better shooting angle, and the like. For example, as shown in FIG. 4, the second user finds that the first user is at the left of center in the preview image based on the second terminal 20, and may input a voice "move one step to the left" or "move the mobile phone a little to the left hand side". The second terminal 20 may send the collected input voice to the first terminal 10, so that the first terminal 10 plays the input voice, to prompt the first user to adjust his position or the position of the first terminal 10, so as to adjust a position of the first user in the new preview image, thereby achieving adjustment. Therefore, when it is inconvenient for the user to shoot by himself, a better shooting effect can be obtained under the prompting of other users.

In addition, the second user may input the adjustment prompt information for prompting the first user to adjust his posture, such as "Do not be too rigid, relax your shoulders", and may also input the adjustment prompt information for prompting the first user to adjust the posture of the first terminal. For example, if the second user thinks, based on the preview image obtained by the first terminal, that the scenery that can be photographed is more beautiful if the shooting angle of the first terminal 10 is turned 20° to the right hand side of the first user, the second user may input a voice "Let's turn the mobile phone 20° to your right hand side and have a look", the second terminal 20 may collects the input voice and send the collected input voice to the first terminal 10 for uploading, to prompt the first user to adjust the angle of the first terminal 10.

It should be noted that, although in the foregoing schematic diagram, the display information of the first terminal 10 is displayed in full screen on the second terminal 20, the second terminal may display the display information of the first terminal in full screen, or display other content together with the display information of the first terminal according to actual needs and designs, which is not limited in the present disclosure.

In some implementations, the first terminal may include an audio playback device, and the adjustment prompt information may be played through the audio playback device. The audio playback device may be integrated into the first terminal, such as a speaker, or may be connected to the first terminal in a wired or wireless manner, such as an earphone, a smart watch, or other audio-playing device, which is not limited in the present disclosure.

In an implementation, the first terminal may be integrated with a wireless communication module, such as a Bluetooth module, a WiFi module, and the like, the first terminal may be connected to a wireless headset through the wireless communication module to output the adjustment prompt information through the wireless headset. In this case, when the first user is distant from the first terminal, the adjustment prompt information can still be clearly transmitted through the wireless headset, so that the first user can hear the prompt of the second user. Even if the first user cannot see the screen of the first terminal or the preview image clearly, or even cannot see the screen of the first terminal or the preview image, the first user can still adjust the posture under the prompt of the second user through the headset to perform shooting, which greatly reduces the operating cost of the user when the user shoots by himself, especially when the user wants to shoot himself. In addition, the attitude adjustment is performed under the prompt of the second user and the shooting parameter is adjusted by the second user, the shooting quality is greatly improved, thereby improving the user experience.

For example, in a scenario, user A encounters a landscape and wants to take a selfie with the landscape as the background, that is, to take a picture of himself in the landscape, but the user A cannot control the terminal to shoot by himself to achieve a desired effect, since the shooting angle when holding the terminal is not good, the field of view is not large enough, and the like. In this case, the user A may invite user B (which may be a user good at taking pictures in a collaborative shooting platform, a friend of user A, or not a friend of user A) to assist in shooting through the above method. The user B may use his own terminal b to view the preview image obtained by a terminal a of the user A, and communicate with the user A through remote control and/or by inputting the adjustment prompt information through the terminal b to instruct the user A to shoot. In this way, the user A can shoot an image or video with a desired effect with the assistance of the user B, which not only reduces the operation cost of the user A, but also improves the shooting quality.

In step S240, the preview image currently obtained by the first terminal is captured in response to a shooting instruction.

In step S250, the captured image is obtained.

The shooting instruction may be triggered by the first terminal or the second terminal. Correspondingly, the first user may control the moment to press the shutter, or the second user may control the moment to press the shutter according to the preview image obtained by the first terminal, to obtain an image that meets the user's needs. If the shooting instruction is triggered by the second terminal, the shooting instruction may be sent to the first terminal through the collaborative shooting information, so that the first terminal obtains the shooting instruction through the collaborative shooting information. Since the collaborative shooting information in this embodiment includes at least one of the shooting adjustment instruction and the adjustment prompt information, the first terminal has adjusted the preview image obtained by the first terminal according to the collaborative shooting information, and the preview image obtained by the first terminal performing the collaborative shooting operation may be captured in response to the shooting instruction, to obtain the captured image.

In some implementations, the shooting instruction may be triggered by the first terminal, and the user may directly manipulate the shooting control displayed on the screen of the first terminal to trigger the shooting instruction, or may trigger the shooting instruction through an external device connected to the first terminal.

The external device may be an audio playback device such as a headset, or a wearable device such as a smart watch, a wristband, AR glasses, and the like. The type of the external device is not limited in the embodiments of the present disclosure. It can be understood that, by triggering the shooting instruction through the external device connected to the first terminal, the shooting instruction can be triggered without the user directly manipulating the first terminal. The external device may receive at least one of a voice signal, a touch signal, and a pressing signal, and the like.

In an implementation, the external device may obtain a voice signal and send the voice signal to the first terminal to perform voice recognition on the voice signal, and obtain a corresponding voice recognition result. If the voice recognition result indicates shooting, for example, the user says "shooting" to the external device, an instruction corresponding to the voice recognition result, that is, the shooting instruction is obtained. In this way, when it is inconvenient for the user to manipulate the terminal by hand, shooting can still be performed, which reduces the operation cost of the user when shooting by himself.

In an implementation, the external device is provided with a touch key to trigger the shooting instruction, and the touch key may be a physical key that can be pressed or a virtual key that cannot be pressed. The external device may detect an operation acting on the touch key, and if the operation acting on the touch key is detected, the external terminal may send the corresponding shooting instruction to the first terminal, so that the first terminal obtains the shooting instruction. For example, if the external device is an earphone, the user may trigger the shooting instruction by pressing a designated button (such as a play/pause button) on the earphone, so that the first terminal obtains the shooting instruction. For example, if the external device is an earphone, and the earphone integrates a touch control module, such as a touch chip, the shooting instruction may be triggered through a designated touch operation (such as double-click, triple-click, and the like), and sent to the first terminal, so that the first terminal obtain the shooting instruction. For example, the external device is a smart watch having a touch screen, and the touch screen may display the shooting control. If the touch operation by the user on the shooting control is detected, the corresponding shooting instruction may be obtained and sent to the first terminal, such that the first terminal obtained the shooting instruction.

In some implementations, the shooting instruction may alternatively be triggered by the second terminal, and the second user who controls the second terminal may trigger the shooting instruction through the second terminal. The shooting instruction may be sent as the collaborative shooting information to the first terminal, such that the first terminal obtains the shooting instruction through the collaborative shooting information. In this case, performing the collaborative shooting operation corresponding to the collaborative shooting information is step S240. After the captured image is obtained, the image may be outputted as the target image obtained after the collaborative shooting operation is performed. The manner in which the second terminal triggers the shooting instruction is similar to the manner in which the shooting instruction is triggered by the first terminal, and for detailed description, reference can be made to the above description, which will not be repeated here.

In addition, in some possible implementations, the second terminal may trigger the shooting instruction and obtain the image currently captured by the first terminal, and send the captured image to the first terminal. In this way, it can be avoided that, due to the transmission delay between the second terminal and the first terminal, when the shooting instruction triggered by the second terminal is sent to the first terminal, the picture that the second user most wants to capture has been missed. By the second user triggering the shooting instruction, obtaining the currently displayed preview image and sending the obtained image as the captured image to the first terminal, the shooting quality can be improved.

Therefore, the second user who controls the second terminal can not only help the first user to adjust at least one of the shooting posture, the position, the terminal position, and the shooting parameter through the aforementioned operations to improve the shooting quality of the first user, but also help the first user to complete the shooting, which reduces the operation cost of the first user when the first user shoots by himself. For example, when the first user is distant from the first terminal and it is difficult for the first user to trigger the shooting instruction, the user is assisted in triggering the shooting instruction. Further, the preview image observed by the second user can be captured, which helps the user to capture better shooting moments, thereby improving shooting quality, and enhancing user experience.

In step S270, the target image obtained by the first terminal performing the collaborative shooting operation is outputted.

After the first terminal obtains the shooting instruction, the first terminal captures the preview image obtained after the first terminal performs the collaborative shooting operation in response to the shooting instruction, so as to obtain the captured image as the target image, and output the target image.

In some embodiments, after the first terminal outputs the target image, an ending prompt page may be generated, and the ending prompt page is used to confirm whether to disconnect the connection with the second terminal and to end this collaborative shooting. In an example, the ending prompt page may display ending prompt information such as "Please confirm whether to end this collaborative shooting", a button indicating "Yes", and a button indicating "No". The first terminal detects which button is triggered, and obtains an instruction corresponding to the triggered button. For example, if it is detected that the button indicating "No" is triggered, the instruction to continue shooting may be obtained to maintain the connection with the second terminal. In an implementation, the first terminal may continue to perform step S220 and subsequent operations, so that multiple images can be outputted based on one collaborative shooting process, so as to improve the shooting efficiency and avoid repeated connection.

In some implementations, if the confirmation operation acting on the ending prompt page is not detected after a predetermined time period, the first terminal may automatically disconnect the connection with the second terminal to end the collaborative shooting process, so as to avoid unnecessary power consumption due to, for example, forgetting to confirm or other cause.

It should be noted that, for the parts that are not described in detail in these embodiments, reference can be made to the foregoing embodiment, and the details are not repeated here.

Therefore, with the shooting method according to this embodiment, during the collaborative shooting process, the first terminal may send only the preview image obtained by the first terminal to the second terminal in real time, or may send the shooting interface of the first terminal that contains both the preview image and other functional controls, so that the second user can view the preview image obtained by the first terminal in real time or the shooting interface based on the second terminal, and input the collaborative shooting information through the second terminal, where the collaborative shooting information may include the shooting adjustment instruction and/or the adjustment prompt information. The second terminal sends the collaborative shooting information to the first terminal, so that the first terminal performs the collaborative shooting operation corresponding to the collaborative shooting information after obtaining the collaborative shooting information, so as to adjust the preview image currently obtained by the first terminal. Finally, after the adjustment, and in response to the shooting instruction triggered by the first terminal or the second terminal, the preview image obtained by the first terminal performing the collaborative shooting operation is captured, and the captured image is outputted, to finish the assisted shooting of the first user. Since it is often difficult for a user to shoot himself and the landscape at the same time when the proportion of the person and the landscape is appropriate, the shooting method according to this embodiment causes the second user to assist the first user in shooting by remotely controlling the first terminal to achieve shooting control or by guiding the first user to adjust the shooting by inputting the adjustment prompt information, which not only reduces the operation cost of the first user when shooting by himself, but also enables the first user to improve the final shooting quality with the assistance of others. In addition, the effects that can be achieved by the foregoing embodiments can also be achieved.

Figure 7:
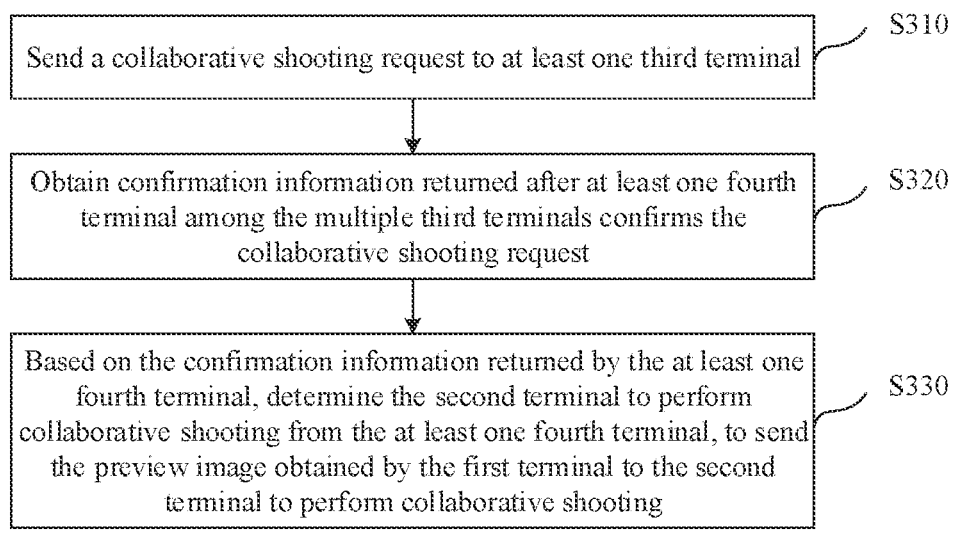
FIG. 7 shows a flowchart of inviting a user to assist in shooting in a shooting method according to an embodiment of the present disclosure.

In some embodiments, before step S110 or step S210, steps S310 to S330 may be further included. Specifically, reference is made to FIG. 7, which shows a flowchart of inviting a user to assist in shooting in a shooting method according to an exemplary embodiment of the present disclosure, which may include the following steps S310 to S330.

In step S310, a collaborative shooting request is sent to at least one third terminal.

When assistance in shooting is required, the first terminal may send the collaborative shooting request to at least one third terminal.

In some implementations, the first terminal may send the collaborative shooting request to one third terminal, where the third terminal may be a terminal of a user designated by the first user on a platform, a terminal of a user who follows the first user on the platform, or a terminal of a user who has a friend relationship with the first user on the platform, and the like, which is not limited in this embodiment. The aforementioned platform may be at least one of a collaborative shooting platform, an instant messaging application, a social networking platform, or other platforms that supports collaborative shooting.

In some exemplary scenarios, Ms. Zhang is traveling and wants to take a photo, but she knows that she has poor shooting skills. If she wants to ask her son Xiao Zhang, who has excellent shooting skills, to help with framing and shooting, she may send a collaborative shooting message to Xiao Zhang's terminal, and Xiao Zhang may input the collaborative shooting information through his terminal to assist Ms. Zhang in shooting. For the method of assisting the shooting, reference can be made in the above embodiments, which will not be repeated here. In this way, Xiao Zhang may view the preview image returned by Ms. Zhang's terminal and instruct Ms. Zhang to adjust the position of the terminal as well as instruct Ms. Zhang to adjust the posture and position, and may also remotely control Ms. Zhang's terminal to adjust the shooting parameter, and trigger the shooting instruction to output the adjusted image. This not only enriches the gameplay of shooting, but also enhances the intimacy between users anytime and anywhere, and improves the user experience while improving the shooting quality and reducing operating costs.

In another exemplary scenario, Han Meimei, who is in a long-distance relationship, wants to film herself dancing, but because she is distant from the screen, she cannot see the screen clearly, and it is inconvenient for her to use the countdown. If she wants her boyfriend who is in Algeria to help her shoot, she may send a collaborative shooting invitation to the boyfriend's terminal, so that the boyfriend can see the pictures collected by Han Meimei's terminal in real time, and instruct Han Meimei to adjust the terminal position, as well as instruct Han Meimei to adjust the posture and position, and also remotely control Han Meimei's terminal to adjust the shooting parameter and trigger the shooting instruction to control to start and stop shooting, so as to output the captured video.

In other implementations, the first user may send the collaborative shooting request to multiple third terminals, for example, the collaborative shooting request may be sent to a designated group. In an example, the first user may click on a control for generating the collaborative shooting request in a chat interface of the group, the first terminal generates the collaborative shooting request by detecting the click operation of the first user, and sends the collaborative shooting request to multiple terminals of multiple users, that is, multiple third terminals, in the group, so that the multiple third terminals in the group receive the collaborative shooting request and choose whether to respond to the collaborative shooting request. In another example, the first user may also select a group in a chat list or a contact list that pops up after the first terminal generates the collaborative shooting request, and send the collaborative shooting request to the terminal of at least one user in the selected group.

In an implementation, the group may include a photography hobby group that gathers multiple photography enthusiasts, and a photographer group that gathers multiple photographers, and the first terminal sends the collaborative shooting request to the photography hobby group or the photographer group, so as to invite users with higher shooting skills to assist in shooting and improve shooting quality. Of course, the first terminal may send the collaborative shooting request to any group to which the first user belongs. It should be noted that the aforementioned group is not limited to the collaborative shooting platform, and may be other platforms, which are not limited here.

In an exemplary implementation, the user of the third terminal follows the first user on the collaborative shooting platform, and when the first user needs help in shooting, he can find the user of the third terminal from a list of people following him, such as a "fans" list, enter a corresponding chat interface, and send the collaborative shooting request to the third terminal, and the user of the third terminal may confirm the collaborative shooting request based on the chatting interface on the third terminal.

In an exemplary implementation, if the user of the third terminal and the user of the first terminal are friends on the instant messaging application, but are not friends on the collaborative shooting platform, the first user may generate the collaborative shooting request on the collaborative shooting platform, and jump to the instant messaging application by sharing, to select the user to send the collaborative shooting request. The user of the third terminal may see the collaborative shooting request through the chat interface with the first user on the instant messaging application, and confirm the collaborative shooting request based on the chat interface.

In some implementations, the collaborative shooting request may be sent in the form of a link, a picture, or a webpage. For example, if the collaborative shooting request is sent in the form of a link, the second user may click on the link corresponding to the collaborative shooting request to trigger the third terminal to display a corresponding invitation page, and the user of the third terminal may confirm on the invitation page.

In addition, in some embodiments, if the first terminal sends the collaborative shooting request to the third terminal through another platform after the collaborative shooting request is generated on the collaborative shooting platform, when the user of the third terminal clicks on the link corresponding to the collaborative shooting request, whether the application corresponding to the collaborative shooting platform that generates the collaborative shooting request has been installed on the third terminal may be detected. If the application corresponding to the collaborative shooting platform has been installed, the third terminal jumps to the application corresponding to the collaborative shooting platform, and displays an invitation page corresponding to the collaborative shooting request based on the collaborative shooting platform, and the user may confirm the request. If the application corresponding to the collaborative shooting platform is not installed, the user of the third terminal may be prompted to install the application from the application market, which is not described in detail here.

In step S320, confirmation information returned after at least one fourth terminal among the multiple third terminals confirms the collaborative shooting request is obtained.

On reception of the collaborative shooting request from the first terminal, the multiple third terminals may detect a confirmation operation performed by a user on the collaborative shooting request, and generate confirmation information when the confirmation operation is detected and send the confirmation information to the first terminal. The first terminal may obtain the confirmation information returned after at least one fourth terminal among the multiple third terminals confirms the collaborative shooting request.

In a specific example, user A does not know how to shoot, and wants to invite user B, who has a high level of shooting skills, to assist him in shooting. User A can invite user B to remotely assist him in shooting regardless of where the user B is. After the user B confirms the invitation, the user B can see the preview image obtained by the terminal of the user A in real time, and control the terminal of the user A to adjust the effect of the preview image obtained by the terminal of the user A. Therefore, when it is inconvenient for the user to shoot by himself, or when the user A wants to shoot a higher-quality image, other users can be invited to assist in shooting, thereby reducing the operation cost when shooting by himself and improving the shooting quality.

In some possible implementations, multiple fourth terminals among the multiple third terminals simultaneously confirm the collaborative shooting request of the first terminal, and send confirmation information to the first terminal, then the first terminal can simultaneously perform collaborative shooting with the multiple fourth terminal.

In one example, if user A wants to get shooting suggestions from multiple people when he needs to shoot outside, he can invite multiple users at the same time, such as his own family members, so that the family members can provide suggestions for user A's shooting together, which not only enriches the shooting interaction manners, improves social functions, but also enhances the intimacy between relatives and friends.

In some embodiments, when at least one fourth terminal confirms the collaborative shooting request, the first terminal may select one or more second terminals from the fourth terminal to establish connection, that is, only one or more second terminals among the fourth terminal assist the first terminal in shooting. Then, in one embodiment, after step S320, step S330 may be further included: based on the confirmation information returned by the at least one fourth terminal, determining the second terminal to perform collaborative shooting from the at least one fourth terminal, to send the preview image obtained by the first terminal to the second terminal to perform collaborative shooting.

For example, user A's terminal may display, according to confirmation information sent by the at least one fourth terminal for the collaborative shooting request, user information corresponding to the at least one fourth terminal (which may include at least one of account information of the second user, information inputted by the second user when confirming the collaborative shooting request), the user A may select one or more fourth terminals as the second terminal to perform collaborative shooting according to the displayed user information. After that, step S110 and subsequent steps or step S210 and subsequent steps are performed.

Figure 8:
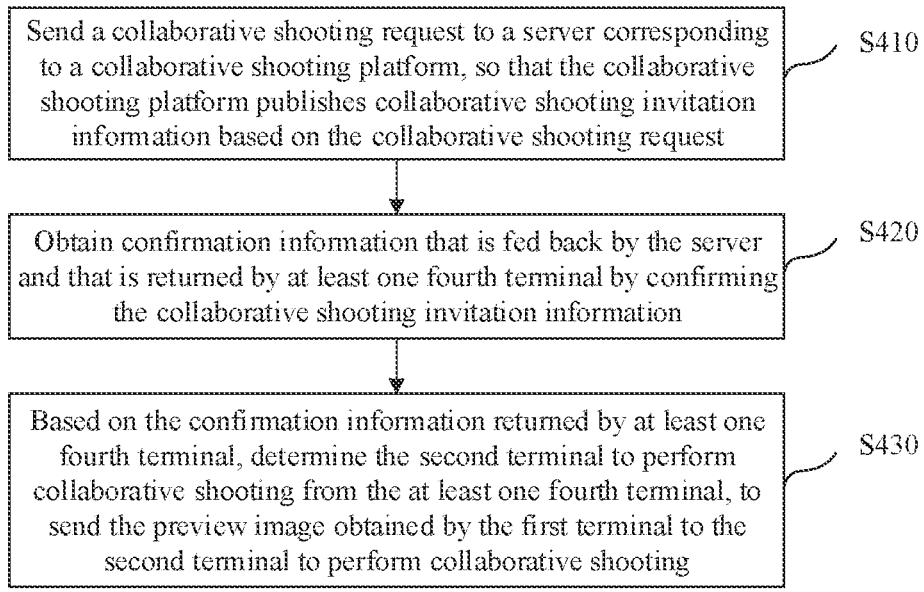
FIG. 8 shows a flowchart of inviting a user to assist in shooting in a shooting method according to another embodiment of the present disclosure.

In addition, in some embodiments, before step S110 or step S210, steps S410 to S420 may be further included. Specifically, reference is made to FIG. 8, which shows a flowchart of inviting a user to assist in shooting in a shooting method according to another exemplary embodiment of the present disclosure, which may include the following steps S410 to S430.

In S410, a collaborative shooting request is sent to a server corresponding to a collaborative shooting platform, so that the collaborative shooting platform publishes collaborative shooting invitation information based on the collaborative shooting request.

The collaborative shooting request may include the shooting content (such as landscapes, people, animals, and the like), the required information for collaborative shooting, including shooting style (such as freshness, imagination, and the like), and the requirements for shooting skills (such as high, medium, low, and the like). The first user may trigger the first terminal to generate a request page for the collaborative shooting request, and input relevant information based on the request page. When the first terminal obtains the page submission instruction, the first terminal generates the collaborative shooting request based on the information inputted by the first user. If the first terminal detects a publish instruction for choosing to be published on the platform, the first terminal may send the collaborative shooting request to the server corresponding to the collaborative shooting platform, so that the collaborative shooting platform publishes the collaborative shooting invitation information based on the collaborative shooting request, so that multiple third terminals can receive the shooting invitation information through the collaborative shooting platform.

The collaborative shooting invitation information is obtained based on the collaborative shooting request, and may carry at least one of information of the sender of the collaborative shooting request and information carried in the collaborative shooting request, so that other users can see the collaborative shooting invitation information based on the collaborative shooting platform, and get relevant information.

In step S420, confirmation information that is fed back by the server and that is returned by at least one fourth terminal by confirming the collaborative shooting invitation information is obtained.

If the third terminal detects the confirmation operation of the user confirming the collaborative shooting invitation information, the third terminal may generate the corresponding confirmation information and return the confirmation information to the server. The server then feeds the confirmation information back to the first terminal. For example, the server may forward the confirmation information to the first terminal. In this way, the first terminal can obtain the confirmation information that is fed back by the server, and that is returned by the at least one fourth terminal among the multiple third terminals by confirming the collaborative shooting invitation information.

In an embodiment, the shooting level indicated by the user information corresponding to the third terminal meets the specified shooting condition. In some implementations, when the first user sends the collaborative shooting request to the server corresponding to the collaborative shooting platform, the first terminal may set an invitation confirmation condition for the collaborative shooting request, and when a user accepts the collaborative shooting request, it is first determined whether the shooting level indicated by the user information of the user meets the specified shooting condition, and if the shooting level meets the specified shooting condition, it is determined that the invitation confirmation condition is met, and the user is allowed to confirm the collaborative shooting request based on his terminal.

In an example, user B clicks on the link corresponding to the collaborative shooting request sent by user A, and the terminal used by the user B displays a corresponding interface including a confirmation button for confirming the collaborative shooting request. For example, words such as "Accept the invitation", "Confirm acceptance" indicating confirming the collaborative shooting request may be displayed on the button. In this case, if the shooting level indicated by the user information of the user B does not meet the specified shooting condition, the confirmation button is not clickable or clicking of the confirmation button does not trigger the confirmation of the collaborative shooting request; and if the shooting level indicated by the user information of the user B meets the specified shooting condition, the confirmation button is clickable, a touch operation on the confirmation button by the user B is detected, confirmation of the collaborative shooting request is triggered in response to the touch operation, and the confirmation information is returned to the terminal of the user A to accept the collaborative shooting invitation from the user A.

In some embodiments, if there is at least one fourth terminal among the multiple third terminals that confirms the collaborative shooting request, that is, when the first terminal obtains confirmation information corresponding to at least one fourth terminal, the first terminal may select one or more of the at least one fourth terminal as the second terminal to perform collaborative shooting. Then, in an embodiment, after step S420, step S430 may be further included: determining, based on the confirmation information returned by the at least one fourth terminal, the second terminal to perform collaborative shooting from the at least one fourth terminal, to send the preview image obtained by the first terminal to the second terminal to perform collaborative shooting.

Therefore, with the method of inviting a user to assist in shooting enables the user to invite others through the aforementioned method in various scenarios requiring assistance from others, and to perform the shooting with the assistance of others through the shooting method according to the aforementioned embodiments. Therefore, when it is difficult for the user to shoot alone, other users are invited to assist in shooting to reduce the operation cost of the user, and when it is difficult for the user to shoot high-quality images, other users are invited to assist in shooting to improve the shooting quality. Further, the shooting gameplay is enriched, the communication between users is enhanced and the user experience is improved.

Figure 9:
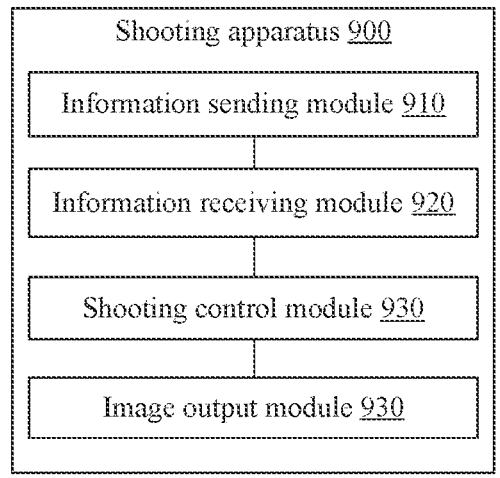
FIG. 9 shows a block diagram of modules of a shooting apparatus according to an embodiment of the present disclosure.

Reference is made to FIG. 9, which is a block diagram of a shooting apparatus according to an embodiment of the present disclosure. The shooting apparatus 900 according to an embodiment of the present disclosure may include: an information sending module 910, an information receiving module 920, a shooting control module 930, and an image output module 940.

The information sending module 910 is configured to send a preview image obtained by the first terminal to a second terminal during a collaborative shooting process.

The information receiving module 920 is configured to receive collaborative shooting information inputted by the second terminal based on the preview image, the collaborative shooting information being used to instruct a shooting process of the first terminal.

The shooting control module 930 is configured to perform a collaborative shooting operation corresponding to the collaborative shooting information.

The image output module 940 is configured to output a target image obtained by the first terminal performing the collaborative shooting operation.

In an embodiment, the collaborative shooting information includes a shooting adjustment instruction, and the shooting control module 930 may include a shooting adjustment sub-module. The shooting adjustment sub-module is configured to adjust a shooting parameter of the first terminal according to the shooting adjustment instruction, where the shooting adjustment instruction is inputted based on the second terminal and is used to control the first terminal, and the shooting parameter is used to control an image shooting operation of the first terminal to obtain the target image.

In an embodiment, the collaborative shooting information includes adjustment prompt information, and the shooting control module 930 may include prompt output sub-module. The prompt output sub-module is configured to output the adjustment prompt information to prompt a first user of the first terminal to adjust a position and/or a posture of a target object, where the target object includes the first terminal and/or the first user, and the adjustment prompt information is inputted by a second user corresponding to the second terminal based on the currently acquired preview image.

In an embodiment, the first terminal includes an audio playback device, and the prompt output sub-module may include an audio playback unit. The audio playback unit is configured to play the adjustment prompt information through the audio playback device.

In an embodiment, the collaborative shooting information includes a shooting instruction, and the shooting control module 930 may include an image capturing module and an image obtaining module.

The image capturing module is configured to capture the preview image currently obtained by the first terminal in response to the shooting instruction.

The image obtaining module is configured to obtain the captured image.

In an embodiment, the information sending module 910 includes: an interface sending sub-module, configured to send a shooting interface of the first terminal the second terminal during the collaborative shooting process, the shooting interface including at least one function control and the preview image obtained by the first terminal.

In an embodiment, the shooting apparatus 900 further includes: a shooting requesting module, a shooting confirming module and a terminal determining module.

The shooting requesting module is configured to send a collaborative shooting request to multiple third terminals.

The shooting confirming module is configured to obtain confirmation information returned after at least one fourth terminal among the multiple third terminals confirms the collaborative shooting request.

The terminal determining module is configured to determine, based on the confirmation information returned by the at least one fourth terminal, the second terminal to perform collaborative shooting from the at least one fourth terminal, to send the preview image obtained by the first terminal to the second terminal to perform collaborative shooting.

The shooting apparatus according to the embodiments of the present disclosure may execute the shooting method according to the embodiments of the present disclosure, and the implementation principle is similar to the shooting method according to the embodiments of the present disclosure. Actions performed by the respective modules in the shooting apparatus according to the embodiments of the present disclosure correspond to the steps in the shooting method according to the embodiments of the present disclosure. For the detailed functional description of the respective modules of the shooting apparatus, reference can be made to the description in the corresponding shooting method shown above, which will not be repeated here.

Figure 10:
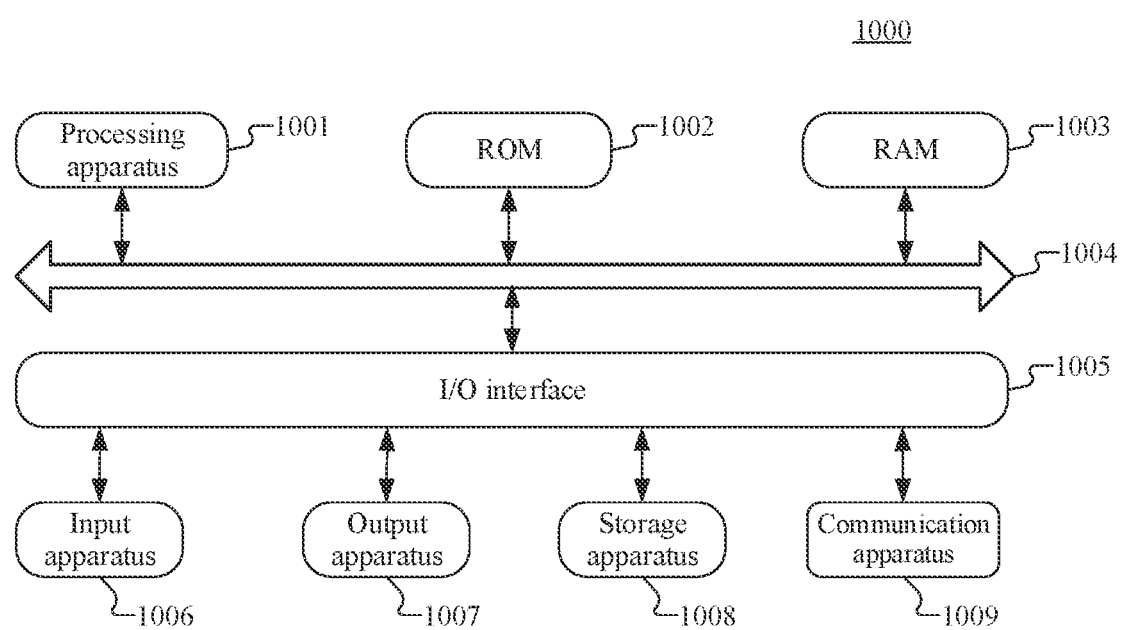
FIG. 10 shows a block diagram of a structure of an electronic device according to an embodiment of the present disclosure.

Reference is made to FIG. 10, which shows a schematic structural diagram of an electronic device 1000 suitable for implementing the embodiments of the present disclosure. The electronic device according to the embodiments of the present disclosure may include, but is not limited to, a device such as a computer. The electronic device shown in FIG. 10 is only exemplary, and should not indicate any limitation to the function and scope of application of the embodiments of the present disclosure.

The electronic device 1000 includes: a memory and a processor. The processor may be referred to herein as processing apparatus 1001 in the following description, and the memory may include at least one of read-only memory (ROM) 1002, random access memory (RAM) 1003, and storage apparatus 1008 in the following description.

As shown in FIG. 10, the electronic device 1000 may include a processing apparatus 1001, such as a central processing unit (CPU) or a graphics processor, which can execute various appropriate actions and processes based on a program stored in the Read Only Memory (ROM) 1002 or a program loaded from the storage apparatus 1008 into the Random Access Memory (RAM) 1003. In the RAM 1003, various programs and data required by the electronic device 1000 for operation are further stored. The processing apparatus 1001, the ROM 1002, and the RAM 1003 are connected to each other through a bus 1004. An input/output (I/O) interface 1005 is also connected to the bus 1004.

Generally, the following may be connected to the I/O interface 1005: an input apparatus 1006 such as a touch screen, a touch pad, a keyboard, a mouse, a camera, a microphone, an accelerometer, a gyroscope, an output apparatus 1007 such as a Liquid Crystal Display (LCD), a speaker, a vibrator, a storage apparatus 1008 such as a magnetic tape and a hard disk, and a communication apparatus 1009. Based on the communication apparatus 1009, the electronic device 1000 may communicate with other devices through wired or wireless communication to exchange data. Although FIG. 10 shows the electronic device 1000 including various apparatuses, it should be understood that not all shown apparatuses are required to be implemented or included. The shown apparatuses may be replaced by other apparatuses, or more or less apparatuses may be included.

In particular, the processes, described above with reference to flow charts, may be implemented as a computer software program according to the embodiments of the present disclosure. For example, a computer program product is provided according to the embodiments of the present disclosure, the computer program product includes a computer program carried on a non-transient computer readable storage medium. The computer program includes program codes for performing the method shown in the flowchart. In such embodiments, the computer program may be downloaded and installed from the network through the communication apparatus 1009, installed from the storage apparatus 1008, or installed from the ROM 1002. The computer program, when being executed by the processing apparatus 1001, performs functions defined in the method according to the embodiments of the present disclosure.

It should be noted that the computer readable storage medium according to the present disclosure, may be a computer readable signal medium or a computer readable storage medium or any combination of the two. The computer readable storage medium can be, for example, but not limited to, an electronic, magnetic, optical, electromagnetic, infrared, or semiconductor system, apparatus, or device, or any combination of the foregoing. More particularly, the computer readable storage medium may include, but not limited to, an electrical connection having one or more wires, a portable computer diskette, a hard disk, a Random-Access Memory (RAM), a Read-Only Memory (ROM), an Erasable Programmable Read-Only Memory (EPROM or Flash memory), an optical fiber, a portable Compact Disk Read-Only Memory (CD-ROM), an optical storage device, a magnetic storage device, or any suitable combination of the foregoing. In the present disclosure, the computer readable storage medium can be any tangible medium containing or storing a program, where the program can be used by an instruction execution system, apparatus or device or used in combination therewith. In the present disclosure, the computer readable signal medium may include a data signal transmitted in a baseband or transmitted as a part of a carrier wave. The data signal carries computer readable program codes. The transmitted data signal may has a variety of forms including, but not limited to, an electromagnetic signal, an optical signal, or any suitable combination of the above. The computer readable signal medium may also be any other computer readable medium except for the computer readable storage medium. The computer readable signal medium can send, transmit or transfer programs used by an instruction execution system, apparatus or device or used in combination therewith. The program codes included in the computer readable storage medium may be transferred through any proper medium including, but not limited to, an electric wire, an optical cable, RF (Radio Frequency), and the like, and any proper combination of the foregoing.

In some embodiments, the client and the server can communicate by using any currently known or future developed network protocol such as HTTP (HyperText Transfer Protocol), and can be interconnected with digital data communication in any form or medium (for example, a communication network). Examples of the communication network include Local Area Network ("LAN"), Wide Area Network ("WAN"), an internet (for example, the Internet), and an end-to-end network (for example, the ad hoc end-to-end network), as well as any currently known or future developed network.

The computer readable storage medium may be included in the electronic device, or may exist alone, without being assembled into the electronic device.

The computer readable storage medium may carry one or more programs. The one or more programs, when executed by the electronic device, cause the electronic device to: send a preview image obtained by the first terminal to a second terminal during a collaborative shooting process; receive collaborative shooting information inputted by the second terminal based on the preview image, the collaborative shooting information being used to instruct a shooting process of the first terminal; perform a collaborative shooting operation corresponding to the collaborative shooting information; and output a target image obtained by the first terminal performing the collaborative shooting operation.

The computer program codes for performing the operations according the present disclosure may be written in at least one programming language or a combination of the at least one programming language. The programming language includes, but is not limited to, an object oriented programming language such as Java, Smalltalk, C++ and a conventional procedural programming language such as "C" programming language or a programming language similar to "C" programming language. The program codes may be completely executed on a user computer, partially executed on the user computer, executed as a standalone software package, partially executed on the user computer and partially executed on a remote computer, completely executed on the remote computer or a server. In the cases relating to the remote computer, the remote computer may be connected to the user computer via any kind of networks including Local Area Network (LAN) or Wide Area Network (WAN), or the remote computer may be connected to an external computer (for example, via Internet provided by an Internet service provider).

The flowcharts and block diagrams in the drawings show architectures, functions and operations that may be realized with the systems, methods and computer program products according to the embodiments of the present disclosure. Each block in the flowcharts or block diagrams may represent a module, a program segment or a part of codes. The module, the program segment or the part of codes includes one or more executable instructions for implementing a specified logical function. It should be noted that in some substitution implementations, functions indicated in the blocks may also occur in an order different from that indicated in the drawings. For example, two steps respectively indicated in two blocks that are connected to each other in an order may be implemented in parallel. Sometimes the two steps may be implemented in a reverse order, which depends on a function related to the steps. It should also be noted that each block in the block diagrams and/or flowcharts and a combination of blocks in the block diagrams and/or flowcharts may be implemented by a special hardware-based system for performing a specified function or operation or implemented by a combination of a special hardware and a computer instruction.

Modules or units involved in the embodiments of the present disclosure may be implemented by software or by hardware. The names of the modules or the units do not in any way constitute a limitation on the unit itself. For example, the display module may also be described as "a module for displaying a resource uploading interface".

The functions described hereinabove may be performed at least in part by one or more hardware logic components. For example, without limitation, exemplary types of hardware logic components that can be used include: Field Programmable Gate Array (FPGA), Application Specific Integrated Circuit (ASIC), Application Specific Standard Parts (ASSP), System on Chip (SOC), Complex Programmable Logical device (CPLD), and the like.

In the context of the present disclosure, the computer-readable storage medium may be a tangible medium that may contain or store a program to be used by an instruction execution system, apparatus or device or used in combination therewith. The computer-readable storage medium may be a machine-readable signal medium or a machine-readable storage medium. The computer-readable storage medium may include, but is not limited to, an electronic, magnetic, optical, electromagnetic, infrared, or semiconductor system, apparatus or device, or any suitable combination of the foregoing. More specific examples of the machine-readable storage medium include an electrical connection having one or more wires, a portable computer diskette, a hard disk, a Random-Access Memory (RAM), a Read-Only Memory (ROM), an Erasable Programmable Read-Only Memory (EPROM or Flash memory), an optical fiber, a portable Compact Disk Read-Only Memory (CD-ROM), an optical storage device, a magnetic storage device, or any suitable combination of the foregoing.

According to one or more embodiments of the present disclosure, a shooting method is provided. The shooting method is applied to a first terminal and includes: sending a preview image obtained by the first terminal to a second terminal during a collaborative shooting process; receiving collaborative shooting information inputted by the second terminal based on the preview image, the collaborative shooting information being used to instruct a shooting process of the first terminal; performing a collaborative shooting operation corresponding to the collaborative shooting information; and outputting a target image obtained by the first terminal performing the collaborative shooting operation.

In an embodiment, the collaborative shooting information includes a shooting adjustment instruction, and the performing a collaborative shooting operation corresponding to the collaborative shooting information includes: adjusting a shooting parameter of the first terminal according to the shooting adjustment instruction, where the shooting adjustment instruction is inputted based on the second terminal and is used to control the first terminal, and the shooting parameter is used to control an image shooting operation of the first terminal to obtain the target image.

In an embodiment, the collaborative shooting information includes adjustment prompt information, and the performing a collaborative shooting operation corresponding to the collaborative shooting information includes: outputting the adjustment prompt information to prompt a first user of the first terminal to adjust a position and/or a posture of a target object, where the target object includes the first terminal and/or the first user, and the adjustment prompt information is inputted by a second user corresponding to the second terminal based on the currently acquired preview image.

In an embodiment, the first terminal includes an audio playback device, and the outputting the adjustment prompt information includes: playing the adjustment prompt information through the audio playback device.

In an embodiment, the collaborative shooting information includes a shooting instruction, and the performing an operation corresponding to the collaborative shooting information further includes: capturing the preview image currently obtained by the first terminal in response to the shooting instruction; and obtaining the captured image.

In an embodiment, the sending a preview image obtained by the first terminal to a second terminal during a collaborative shooting process includes: sending a shooting interface of the first terminal the second terminal during the collaborative shooting process, the shooting interface including at least one function control and the preview image obtained by the first terminal.

In an embodiment, before the sending a preview image obtained by the first terminal to a second terminal during a collaborative shooting process, the method further includes: sending a collaborative shooting request to multiple third terminals; obtaining confirmation information returned after at least one fourth terminal among the multiple third terminals confirms the collaborative shooting request; and determining, based on the confirmation information returned by the at least one fourth terminal, the second terminal to perform collaborative shooting from the at least one fourth terminal, to send the preview image obtained by the first terminal to the second terminal to perform collaborative shooting.

According to one or more embodiments of the present disclosure, a shooting apparatus is provided. The shooting apparatus is applied to a first terminal and includes: an information sending module, configured to send a preview image obtained by the first terminal to a second terminal during a collaborative shooting process; an information receiving module, configured to receive collaborative shooting information inputted by the second terminal based on the preview image, the collaborative shooting information being used to instruct a shooting process of the first terminal; a shooting control module, configured to perform a collaborative shooting operation corresponding to the collaborative shooting information; and an image output module, configured to output a target image obtained by the first terminal performing the collaborative shooting operation.

In an embodiment, the collaborative shooting information includes a shooting adjustment instruction, and the shooting control module may include a shooting adjustment sub-module. The shooting adjustment sub-module is configured to adjust a shooting parameter of the first terminal according to the shooting adjustment instruction, where the shooting adjustment instruction is inputted based on the second terminal and is used to control the first terminal, and the shooting parameter is used to control an image shooting operation of the first terminal to obtain the target image.

In an embodiment, the collaborative shooting information includes adjustment prompt information, and the shooting control module may include prompt output sub-module. The prompt output sub-module is configured to output the adjustment prompt information to prompt a first user of the first terminal to adjust a position and/or a posture of a target object, where the target object includes the first terminal and/or the first user, and the adjustment prompt information is inputted by a second user corresponding to the second terminal based on the currently acquired preview image.

In an embodiment, the first terminal includes an audio playback device, and the prompt output sub-module may include an audio playback unit. The audio playback unit is configured to play the adjustment prompt information through the audio playback device.

In an embodiment, the collaborative shooting information includes a shooting instruction, and the shooting control module may include an image capturing module and an image obtaining module. The image capturing module is configured to capture the preview image currently obtained by the first terminal in response to the shooting instruction. The image obtaining module is configured to obtain the captured image.

In an embodiment, the information sending module includes: an interface sending sub-module, configured to send a shooting interface of the first terminal the second terminal during the collaborative shooting process, the shooting interface including at least one function control and the preview image obtained by the first terminal.

In an embodiment, the shooting apparatus further includes: a shooting requesting module, a shooting confirming module and a terminal determining module. The shooting requesting module is configured to send a collaborative shooting request to multiple third terminals. The shooting confirming module is configured to obtain confirmation information returned after at least one fourth terminal among the multiple third terminals confirms the collaborative shooting request. The terminal determining module is configured to determine, based on the confirmation information returned by the at least one fourth terminal, the second terminal to perform collaborative shooting from the at least one fourth terminal, to send the preview image obtained by the first terminal to the second terminal to perform collaborative shooting.

The above are only preferred embodiments of the present disclosure and are illustrative of the technical principles applied in the present disclosure. It should be understood by those skilled in the art that the scope of the embodiments of the present disclosure is not limited to the above technical solutions formed by a specific combination of technical features, and also encompasses other technical solutions formed by any combination of the above technical features or equivalent features thereof, without departing from the inventive concept of the present disclosure, for example, technical solutions formed by replacing the above features with (but not limited to) technical features having similar functions with the technical features disclosed in present disclosure.

In addition, although the operations are depicted in a specific order, it should not be understood as these operations are required to be performed in the specific order shown or performed in a sequential order. Under certain circumstances, multitasking and parallel processing may be advantageous. Likewise, although several specific implementation details are included in the above discussion, these should not be construed as limiting the scope of the present disclosure. Certain features that are described in the context of separate embodiments can also be implemented in combination in a single embodiment. Conversely, various features described in the context of a single embodiment can also be implemented in multiple embodiments individually or in any suitable sub-combination. Although the subject matter has been described in language specific to structural features and/or method logical actions, it should be understood that the subject matter defined in the appended claims is not necessarily limited to the specific features or actions described above. On the contrary, the specific features and actions described above are merely exemplary forms of implementing the claims.

The invention claimed is:

1. A shooting method applied to a first terminal, the method comprising:
   sending a preview image obtained by the first terminal to a second terminal during a collaborative shooting process;
   receiving collaborative shooting information inputted by the second terminal based on the preview image, the collaborative shooting information being used to instruct a shooting process of the first terminal;
   performing a collaborative shooting operation corresponding to the collaborative shooting information; and
   outputting a target image obtained by the first terminal performing the collaborative shooting operation,
   wherein before the sending the preview image obtained by the first terminal to the second terminal during the collaborative shooting process, the method further comprises:
   sending a collaborative shooting request to a plurality of third terminals;
   obtaining confirmation information returned after at least one fourth terminal among the plurality of third terminals confirms the collaborative shooting request; and
   determining, based on the confirmation information returned by the at least one fourth terminal, the second terminal to perform collaborative shooting from the at least one fourth terminal, to send the preview image obtained by the first terminal to the second terminal to perform collaborative shooting.

2. The method according to claim 1, wherein the collaborative shooting information comprises a shooting adjustment instruction, and the performing the collaborative shooting operation corresponding to the collaborative shooting information comprises:
   adjusting a shooting parameter of the first terminal according to the shooting adjustment instruction, wherein the shooting adjustment instruction is inputted based on the second terminal and is used to control the first terminal, and the shooting parameter is used to control an image shooting operation of the first terminal to obtain the target image.

3. The method according to claim 1, wherein the collaborative shooting information comprises adjustment prompt information, and the performing the collaborative shooting operation corresponding to the collaborative shooting information comprises:
   outputting the adjustment prompt information to prompt a first user of the first terminal to adjust a position and/or a posture of a target object, wherein the target object comprises the first terminal and/or the first user, and the adjustment prompt information is inputted by a second user corresponding to the second terminal based on the currently acquired preview image.

4. The method according to claim 3, wherein the first terminal comprises an audio playback device, and the outputting the adjustment prompt information comprises:
   playing the adjustment prompt information through the audio playback device.

5. The method according to claim 1, wherein the collaborative shooting information comprises a shooting instruction, and the performing an operation corresponding to the collaborative shooting information further comprises:
   capturing the preview image currently obtained by the first terminal in response to the shooting instruction by a second user; and
   obtaining the captured image.

6. The method according to claim 1, wherein the sending the preview image obtained by the first terminal to the second terminal during the collaborative shooting process comprises:
   sending a shooting interface of the first terminal the second terminal during the collaborative shooting process, the shooting interface comprising at least one function control and the preview image obtained by the first terminal.

7. A shooting apparatus applied to a first terminal, the apparatus comprising:
   at least one processor; and
   at least one memory communicatively coupled to the at least one processor and storing instructions that upon execution by the at least one processor cause the apparatus to:
   send a preview image obtained by the first terminal to a second terminal during a collaborative shooting process;
   receive collaborative shooting information inputted by the second terminal based on the preview image, the collaborative shooting information being used to instruct a shooting process of the first terminal;
   perform a collaborative shooting operation corresponding to the collaborative shooting information;
   output a target image obtained by the first terminal performing the collaborative shooting operation;
   send a collaborative shooting request to a plurality of third terminals;
   obtain confirmation information returned after at least one fourth terminal among the plurality of third terminals confirms the collaborative shooting request; and
   determine, based on the confirmation information returned by the at least one fourth terminal, the second terminal to perform collaborative shooting from the at least one fourth terminal, to send the preview image obtained by the first terminal to the second terminal to perform collaborative shooting.

8. The apparatus of claim 7, wherein the collaborative shooting information comprises a shooting adjustment instruction, the at least one memory further storing instructions that upon execution by the at least one processor cause the apparatus to:
   adjust a shooting parameter of the first terminal according to the shooting adjustment instruction, wherein the shooting adjustment instruction is inputted based on the second terminal and is used to control the first terminal, and the shooting parameter is used to control an image shooting operation of the first terminal to obtain the target image.

9. The apparatus of claim 7, wherein the collaborative shooting information comprises adjustment prompt information, the at least one memory further storing instructions that upon execution by the at least one processor cause the apparatus to:
   output the adjustment prompt information to prompt a first user of the first terminal to adjust a position and/or a posture of a target object, wherein the target object comprises the first terminal and/or the first user, and the adjustment prompt information is inputted by a second user corresponding to the second terminal based on the currently acquired preview image.

10. The apparatus of claim 9, wherein the first terminal comprises an audio playback device, the at least one memory further storing instructions that upon execution by the at least one processor cause the apparatus to:

play the adjustment prompt information through the audio playback device.

11. The apparatus of claim 7, wherein the collaborative shooting information comprises a shooting instruction, the at least one memory further storing instructions that upon execution by the at least one processor cause the apparatus to:
    capture the preview image currently obtained by the first terminal in response to the shooting instruction by a second user; and
    obtain the captured image.

12. The apparatus of claim 7, the at least one memory further storing instructions that upon execution by the at least one processor cause the apparatus to:
    send a shooting interface of the first terminal the second terminal during the collaborative shooting process, the shooting interface comprising at least one function control and the preview image obtained by the first terminal.

13. A computer-readable non-transitory storage medium, storing non-transitory computer readable instructions, wherein
    the non-transitory computer readable instructions, when executed by a computer, cause the computer to
    send a preview image obtained by a first terminal to a second terminal during a collaborative shooting process;
    receive collaborative shooting information inputted by the second terminal based on the preview image, the collaborative shooting information being used to instruct a shooting process of the first terminal;
    perform a collaborative shooting operation corresponding to the collaborative shooting information;
    output a target image obtained by the first terminal performing the collaborative shooting operation;
    send a collaborative shooting request to a plurality of third terminals;
    obtain confirmation information returned after at least one fourth terminal among the plurality of third terminals confirms the collaborative shooting request; and
    determine, based on the confirmation information returned by the at least one fourth terminal, the second terminal to perform collaborative shooting from the at least one fourth terminal, to send the preview image obtained by the first terminal to the second terminal to perform collaborative shooting.

* * * * *